Nov. 10, 1936.  V. MILLER ET AL  2,060,681
WELDING ELECTRODE
Filed March 21, 1935
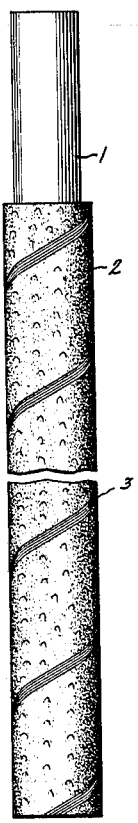
Inventors:
Virdis Miller;
Joseph H. Humberstone,
by Harry E. Dunham
Their Attorney.

Patented Nov. 10, 1936

2,060,681

UNITED STATES PATENT OFFICE 2,060,681

WELDING ELECTRODE

Virdis Miller and Joseph H. Humberstone, Schenectady, N. Y., assignors to General Electric Company, a corporation of New York Application March 21, 1935, Serial No. 12,201

6 Claims. (Cl. 219—8)

Our invention relates to electrodes used in metallic arc welding.

In metallic arc welding an arc is maintained between the work to be welded and a rod, wire or strip of metal usually referred to as an electrode. During welding the electrode is fused or vaporized or both and the metal thereof deposited upon and welded to the work as the electrode is fed toward the work to maintain the arc.

The arcing characteristics of the electrode and the quality of the weld metal deposited thereby depends to a large extent upon the influence of certain elements or compounds associated therewith usually in the form of a coating. Electrodes so coated are commonly referred to as flux coated electrodes.

There are various types of flux coated electrodes. The coating is sometimes of inappreciable thickness and during welding is dissipated so that there is no apparent slag deposit on the weld metal. Some coatings are of appreciable thickness but do not form on the weld a slag deposit of any great thickness. Other coatings are of considerable thickness and form on the weld during the welding operation a slag coating of substantial thickness which adequately protects it from the deleterious effect of the surrounding atmosphere and aids in the refinement of the weld metal. Such heavy coatings also form a shielding crater around the arcing terminal of the electrode which not only directs the arc but materially assists in projecting the molten electrode material toward the weld while protecting it from the surrounding atmosphere.

Our present invention relates primarily to heavy coated electrodes, but is not limited in its application thereto.

It is an object of our invention to provide an improved flux coated electrode.

It is a further object of our invention to provide an electrode suitable for welding with extremely high current values.

It is another object of our invention to provide an electrode which will operate unusually well with alternating current to produce high quality welds in flat, vertical or overhead positions.

Further objects of our invention will appear from the following description taken in connection with the accompanying drawing which illustrates one embodiment thereof.

In the manufacture of electrodes in accordance with one embodiment of our invention we employ a flux paste of susbtantially the following composition:

| | Percent by weight |
|---|---|
| Feldspar | 24 |
| Ilmenite | 18 |
| Asbestos | 14 |
| Ferromanganese | 9 |
| Liquid sodium silicate | 28 |
| Water | 7 |

The anhydrous composition of this flux is substantially as follows:

| | Percent by weight |
|---|---|
| Feldspar | 32 |
| Ilmenite | 24 |
| Asbestos | 19 |
| Ferromanganese | 11 |
| Sodium silicate | 14 |

We have used a potassium feldspar and a ferromanganese of low carbon content. We have also used an asbestos of approximately the following composition:

| | Percent by weight |
|---|---|
| $SiO_2$ | 40.30 |
| $Al_2O_3$ | 1.00 |
| $Fe_2O_3$ | 1.83 |
| FeO | 1.14 |
| MgO | 42.32 |
| $H_2O$ | 13.15 |

The ilmenite may have the following composition:

| | Percent by weight |
|---|---|
| $TiO_2$ | 50.68 |
| $Fe_2O_3$ and FeO | 41.7 |
| $SiO_2$ | 1.46 |
| CaO | .064 |
| MgO | .052 |

The presence of ilmenite in substantial percentages causes the flux material to form a slag which is characterized by its ability to cover the weld metal. Due to its presence, the surface of the weld metal also becomes smooth and of good appearance. The asbestos renders the slag resulting from the flux coating capable of absorbing large quantities of iron oxide which is formed during the welding operation. The ferromanganese is a deoxidizer and increases the fluidity of the weld metal. It is, of course, apparent that other deoxidizing materials may be employed in place of the ferromanganese.

According to one method of manufacturing this flux the feldspar, ilmenite, asbestos and ferromanganese are ground to a fine powder and mixed with liquid sodium silicate having a specific gravity of 40° Baumé, a $Na_2O$ content of about 8% and a ratio $Na_2O$ to $SiO_2$ of approximately 1 to 3.25. As will be noted from the composition above given, a small amount of water is also added. The paste thus formed is of smooth texture and may be readily applied to a rod in the manufacture of welding electrodes.

Since the composition of the ingredients may vary considerably according to their origin, the nature of the flux may best be described by stating its anhydrous composition in percentages of chemical radicals present therein. One composition is as follows:

| | Percent by weight |
|---|---|
| $SiO_2$ | 40 |
| $Al_2O_3$ | 6 |
| $Fe_2O_3$ and $FeO$ | 11 |
| $TiO_2$ | 13 |
| FeMn | 12 |
| $Na_2O$ | 4 |
| $K_2O$ | 4 |
| MgO | 8 |

The above percentages will not add up to 100% due to the failure to include therein the ignition loss and the small percentages of impurities present in the ingredients.

The essential radical ingredients are $SiO_2$, $Fe_2O_3$, and $TiO_2$ considered as a group, FeMn and MgO. These radical constituents may vary as follows:

| | Percent by weight |
|---|---|
| $SiO_2$ | 30–50 |
| $Fe_2O_3$ and $TiO_2$ | 15–30 |
| FeMn | 5–20 |
| MgO | 5–15 |

Under certain conditions $Al_2O_3$ may be considered as an essential radical ingredient when present in percentages from two to ten with the above referred to essential ingredients. The $Al_2O_3$ gives volume to the slag. By decreasing the $Al_2O_3$ present and increasing the MgO the slag is able to pick up more iron oxide. The amount of MgO required will vary with the amounts of $Fe_2O_3$ and $TiO_2$ present in the flux.

An electrode having a flux coating such as specified above is an improvement on the flux coated electrode disclosed in United States Letters Patent 2,010,722, granted August 6, 1935 on the application of one of us, Joseph H. Humberstone, Serial No. 724,512, filed May 8, 1934, for Welding electrodes and assigned to the same assignee as the present application. The composition of the flux paste disclosed in said application is substantially as follows:

| | Percent by weight |
|---|---|
| Feldspar | 39 |
| Ilmenite | 21 |
| Ferromanganese | 9 |
| Liquid sodium silicate | 31 |

The electrode illustrated in the drawing comprises a metallic core 1 having a flux coating 2 of the nature above described. This flux has been applied to the core of the electrode in conjunction with a coating of fibrous cellulosic material which is impregnated therewith. During welding this material burns liberating shielding gases about the arc and molten weld metal. This fibrous material may be a cotton tape which is folded longitudinally about the core of the electrode with its edges abutting one another and parallel to the axis thereof as described and claimed in the co-pending application of one of us, Joseph H. Humberstone, Serial No. 648,651, filed December 23, 1932, for Welding electrodes and assigned to the same assignee as the present application. The tape is usually applied to the core of the electrode so as to obtain a substantial layer of flux between it and the core of the electrode.

In the process of manufacturing such an electrode, it has been found desirable to hold the tape to the core of the electrode by means of a helical binding 3. This binding is made of a flat strip, the turns of which are spaced a substantial distance from one another as illustrated in the drawing. By employing a flat strip, the outside diameter of the electrode is not increased and the binding is less subject to destruction or removal from the electrode by reason of its engagement with foreign objects. In the electrode illustrated, the binding is made of string formed of a plurality of untwisted strands of thread or vegetable fiber. The presence of this binding on the electrodes is a distinct advantage since it prevents the coating from warping or separating from the electrode core when the coating becomes damp or saturated with water as may occur from exposure to weather conditions. The binding when colored may indicate the flux composition employed on the electrode.

The percentages of flux material and cellulosic material applied to the electrode will vary with the size of the electrode as well as the use to which it is to be put. The cellulosic material will most generally vary from 8% to 15% of the flux coating, the remaining percentage thereof being formed of a dried flux of the composition above described.

Various forms of cellulosic material may be employed as an ingredient in the flux coating. A comminuted material such as wood-flour may be mixed with the other ingredients of the coating and extruded on the electrode. In place of tape, such as referred to above, a woven sleeve may be employed. It is also apparent that the cellulosic material may be present as a cord or cords applied longitudinally of the electrode or wrapped spirally thereabout. The longitudinal cords or turns of a spiral wrapping are preferably separated from one another in order to provide adequate space for the other ingredients of the flux coating which may be extruded thereon during or after the cord or cords have been applied to the core rod.

The electrode illustrated in the drawing is a short length rod such as would usually be employed in hand welding operations. The upper end of the electrode has been bared of flux in order to adapt it for use in an electrode holder by means of which welding current is supplied thereto. Electrodes may be made in accordance with my invention in long lengths for use in automatic or semi-automatic machines by means of which the electrode is fed toward and away from the work to strike and thereafter maintain a welding arc by means of a mechanism which functions in response to a characteristic of the welding arc such as its current or voltage. In such automatic machines the welding current may be supplied to the electrode through incisions or openings made in the flux coating.

When using direct current, an electrode having a flux coating of the above specified composition is best suited for flat welding and works best with reverse polarity, that is, when connected to the positive terminal of the source of supply. The electrode will operate unusually well with alternating current for flat, vertical, or overhead welding.

The technic of handling an electrode with a flux coating of the above composition is in no way critical. A long arc can be used or the electrode can be dragged along the work without an appreciable difference in the quality of deposit. The normal arcing voltage is from 30 to 40 volts. Extremely high current values may be used. For example, with a ¼" electrode and a current strength of 500 amperes, high quality welds may be made without increasing the spatter loss appreciably from that resulting when welding with 300 amperes. The appearance of the weld is smooth and most uniform. The metal fuses upward to the side walls further improving the weld appearance. This characteristic is particularly advantageous in that it eliminates the time and labor ordinarily spent in chipping out slags from pocket at the line of fusion.

The slagging characteristics of an electrode provided with our flux accounts largely for the good appearance of its welds. The slag is light in weight and completely covers the weld metal deposit. It is very easily removed; in fact, if the weld is permitted to cool, the slag will crack into large flakes which release themselves from the metal so that their removal requires practically no effort.

An electrode having the flux composition above decribed will produce flat welds with direct current and flat, vertical or overhead welds with alternating current of a quality which meets Class 1 requirements of the American Society of Mechanical Engineers Boiler Construction Code.

When welding boiler plate of fire box quality with a ferrous electrode of substantially the following composition:

| | |
|---|---|
| Carbon | .13–.18% |
| Manganese | .40–.60% |
| Phosphorus | .04% Max. |
| Sulphur | .04% Max. |
| Silicon | .025% Max. |
| Iron | Remainder | having a flux coating such as specifically described above, welds of the following characteristics are obtainable:

| | Direct current reverse polarity | Alternating current |
|---|---|---|
| Ultimate tensile strength—lbs/in² | 65000–75000 | 65000–75000 |
| Elongation—2"—% | 24–32 | 28–36 |
| Density | 7.81–7.83 | 7.82–7.84 |
| Free Bend—% | 35–60 | 35–60 |
| Charpy ft. lbs | 25–35 | 25–35 |

It is, of course, apparent that a flux of the composition above specified will produce beneficial results whether it is applied to the electrode as a coating as above described or associated therewith in any other suitable manner. For example, the flux may be enclosed within a channel within the electrode or placed in grooves or depressions on the surface of the electrode without departing from our invention. Furthermore, it is not always necessary to use a cellulosic material as an ingredient of the flux coating.

What we claim as new and desire to secure by Letters Patent of the United States is:

1. A welding electrode having a flux coating, the anhydrous composition of which, expressed in percentages of essential chemical radicals present therein is substantially as follows:

| | Percent |
|---|---|
| $SiO_2$ | 30–50 |
| $Fe_2O_3$ and $TiO_2$ | 15–30 |
| FeMn | 5–20 |
| MgO | 5–15 |

2. A welding electrode having a flux coating the anhydrous composition of which expressed in percentages of essential chemical radicals present therein is substantially as follows:

| | Percent |
|---|---|
| $SiO_2$ | 30–50 |
| $Fe_2O_3$ and $TiO_2$ | 15–30 |
| FeMn | 5–20 |
| MgO | 5–15 |
| $Al_2O_3$ | 2–10 |

3. A welding electrode having a flux coating the anhydrous composition of which expressed in percentages of chemical radicals present therein is substantially as follows:

| | Percent by weight |
|---|---|
| $SiO_2$ | 40 |
| $Al_2O_3$ | 6 |
| $Fe_2O_3$ and FeO | 11 |
| $TiO_2$ | 13 |
| FeMn | 12 |
| $Na_2O$ | 4 |
| $K_2O$ | 4 |
| MgO | 8 |

4. A welding electrode having a coating, 8 to 15 per cent of its total weight being cellulosic material impregnated with a material the anhydous composition of which is substantially as follows:

| | Percent by weight |
|---|---|
| $SiO_2$ | 40 |
| $Al_2O_3$ | 6 |
| $Fe_2O_3$ and FeO | 11 |
| $TiO_2$ | 13 |
| FeMn | 12 |
| $Na_2O$ | .4 |
| $K_2O$ | 4 |
| MgO | 8 |

5. A welding electrode having the flux coating resulting from applying thereto substantially the following composition:

| | Percent by weight |
|---|---|
| Feldspar | 24 |
| Ilmenite | 18 |
| Asbestos | 14 |
| Metallic deoxidizer | 9 |
| Liquid sodium silicate | 28 |
| Water | 7 |

6. A ferrous rod having a heavy coating of substantially uniform composition 8 to 15 per cent of which is formed of cellulosic material and the remainder of which is formed of a material the anhydrous composition of which is substantially as follows:

| | Percent by weight |
|---|---|
| Feldspar | 32 |
| Ilmenite | 24 |
| Asbestos | 19 |
| Ferromanganese | 11 |
| Sodium silicate | 14 |

VIRDIS MILLER.
JOSEPH H. HUMBERSTONE.